United States Patent [19]

Barlow

[11] 4,356,651
[45] Nov. 2, 1982

[54] ROTATABLE NOTE HOLDER

[76] Inventor: William R. Barlow, 4102 - 109th St., S.W., #24, Tacoma, Wash. 98499

[21] Appl. No.: 185,423

[22] Filed: Sep. 9, 1980

[51] Int. Cl.³ .................. G09F 21/00; A44B 21/00; B62D 39/00
[52] U.S. Cl. ...................... 40/308; 280/33.99 A; 40/10 R
[58] Field of Search .................. 40/308, 10 R, 10 D, 40/13, 14, 20 R, 20 A, 320; 280/33.99 A, 33.99 B, 33.99 C, 33.99 T, 33.99 S, 33.99 H, 33.99 F; 281/45, 15, 30

[56] References Cited

U.S. PATENT DOCUMENTS

| 2,864,189 | 12/1958 | Campbell | 40/308 |
| 2,888,761 | 6/1959 | Miller | 40/308 |
| 3,022,593 | 2/1962 | Sides | 40/308 |
| 3,251,543 | 5/1966 | Bush et al. | 40/308 |
| 3,539,204 | 11/1970 | Keller | 40/308 |
| 3,881,267 | 5/1975 | Hicks | 40/308 |
| 3,964,134 | 6/1976 | Newtson | 280/33.99 A |
| 4,034,539 | 7/1977 | Economy | 40/308 |
| 4,274,567 | 6/1981 | Sawyer | 40/10 R |

Primary Examiner—Gene Mancene
Assistant Examiner—Michael J. Foycik, Jr.
Attorney, Agent, or Firm—Kenneth S. Kessler

[57] ABSTRACT

A rotatable note holder for use in conjunction with grocery carts. The rotatable note holder is rotatably attached to either the handle bar of the cart or one of the outer rods of a panel of the grocery cart. The rotatable note holder back panel can be rotated either to a holding position where the user can easily see and reach the clipped coupons or can be rotated parallel to one of the sides of the cart and thereby out of the way.

2 Claims, 7 Drawing Figures

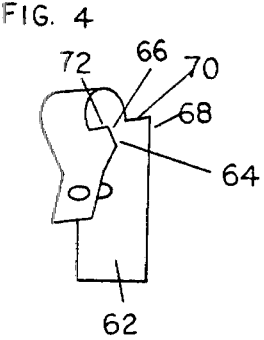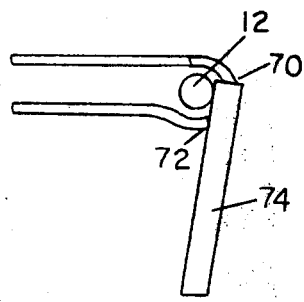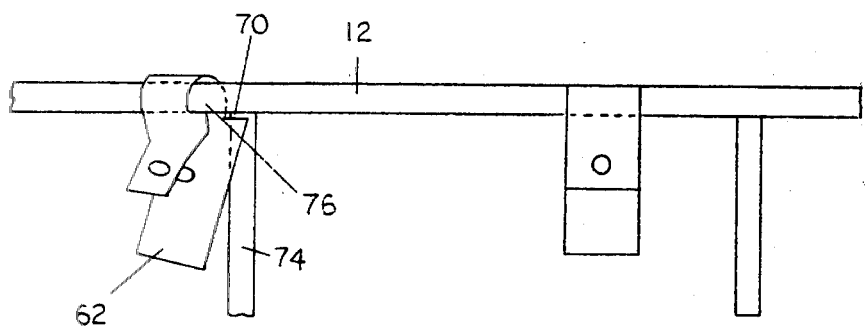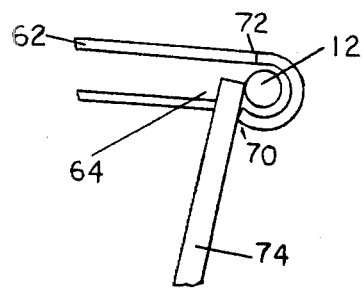

ROTATABLE NOTE HOLDER

BACKGROUND OF THE INVENTION

With the increasing cost of food and other grocery items more and more shoppers are utilizing coupons. Retail outlets are also utilizing coupons to attact additional customers.

One major drawback to collecting coupons is keeping the coupons organized and preventing their loss. For instance, when a shopper is pushing his cart, the shopper wants to easily compare the product with his available coupons without fumbling through a disorganized stack of coupons. In the present invention this is accomplished by a rotatable clipboard which swings into a conveniently viewed position.

Also, a complication also arises with coupons when the customer forgets to turn his coupons into the checker. Invariably, the customer returns at a later time to collect his refund due to the coupon. This leaves the store owner in a dilemma: refund the money and open up a source of loss to the store, or not refund the money and create a source of hard feelings. The present invention is sufficiently versatile to be placed in a position to be viewed by a store checker and a checker can be given such a responsibility, thereby assuring the transacting of coupons at the same time as the goods are sold.

A number of United States patents have addressed themselves to the application of clipboard or attachment devices to grocery carts for holding of notes and other papers.

In U.S. Pat. No. 2,864,189 a device for holding or supporting a merchandise advertising sheet is disclosed. This device holds the shopper's checklist in an upright, permanent position on the handle of the pushcart for easy reference. Because of its construction, it actually requires nuts and bolts to be assembled onto the pushcart. Consequently, in the event the shopper does not want to use the device it cannot be easily removed.

In U.S. Pat. No. 3,539,204 a clipboard for a shopping card is disclosed. This invention provides an attachment for a shopping cart which will hold paper to a board. Thus, because of its construction it is not highly adaptable to the use of holding several coupons. Also, this device is not easily detachable to the pushcart as its construction is such that pressures must be applied at directed position in order to remove the board from the pushcart. Thus, the user would have no control over whether or not it is actually utilized or not.

In U.S. Pat. No. 3,964,134 a grocery cart with clip attachment is disclosed. This device is adaptable for use to hold a pad of paper and a writing instrument, such as a pencil. It is attached to the side of the pushcart for easy reference. One possible drawback with this invention is the stability created therewith. Since it is constructed of plastic type material and attached to the side of the circular rod it is highly unlikely that it will not experience a twisting motion when pressure is applied to its ends when in use.

In U.S. Pat. No. 4,156,318 an attachment for shopping carts is disclosed. This device may be pivotally connected to the rear wall of the shopping cart. Because of design limitations it cannot be detached without great effort. Thus, because of its positioning, it will actually obstruct the use of space in the shopping cart itself.

In U.S. Pat. No. 2,888,761 a directory and clipboard combination device is disclosed. Because of its construction, it is not practical to the new type of shopping cart. Thus, if it was secured to a shopping cart, it would actually hinder the use, because it would block the front portion of the cart where handbags and younger children may be placed.

Thus, as described hereinabove, the above patents do not disclose a practical device which will allow its users to have the flexibility of use or not. In essence, these devices, once installed, cannot be removed or set aside by the customer. It would be highly desirable to have a device which could be used or not without being detached. Because of this device's rotating capacity, it may be actually laid to rest parallel with the side of the grocery cart. Also, because its construction will be from solid type metal material, its strength and stability will greatly exceed that of the prior patents discussed above.

Finally, a further complication arises when the use of the clipboard is either not needed or not desired. The present invention solves this problem by rotating to rest parallel with one of the sides of the grocery cart. This rotation allows for ease in stacking. The present invention is also effective in stacking when the user forgets to rotate the paper clip holder. The plate which holds the coupons and papers is sufficiently flat to allow the clip holder to slip between the openings present in conventional spaces found in grocery carts.

SUMMARY OF THE INVENTION

A rotatable note holder for use with shopping carts is disclosed. The note holder utilizes a surface which holds the coupons or other paper notes with the aid of either a clip or other conventional means.

The surface is rotatably mounted to the shopping cart and can thus be either brought into view by the shopper or rotated parallel to the sides of the cart.

BRIEF DESCRIPTION OF THE DRAWINGS

FIG. 4 is a perspective view of the rotatable swivel which comprises a second rotation mechanism utilized in conjunction with the rotatable note holder.

FIG. 5 is a perspective view of two side by side rotatable note holders illustrating one note holder positioned in a viewing mode and the other note holder in a position parallel to the side of the cart.

FIG. 6 is a side view taken along lines 6—6 illustrating the ledges of the rotatable swivel contacting a back frame bar of the shopping cart.

FIG. 7 is a side view of a second configuration of the rotatable swivel with the back frame bar affixed to the opposing side of the frame rod as illustrated in FIG. 6.

DETAILED DESCRIPTION OF THE DRAWINGS

Figure 1:
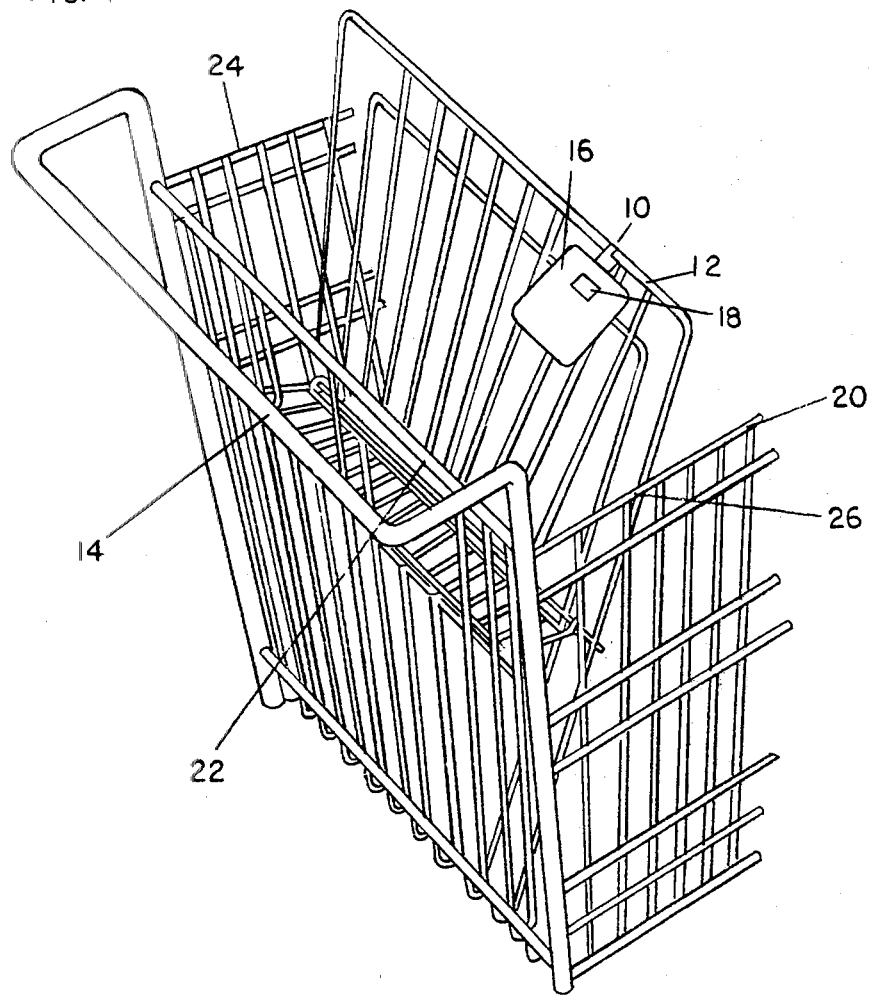
FIG. 1 is a perspective view of the rotatable note holder attached to a typical grocery cart.

The rotatable note holder 10 is illustrated in a perspective view affixed to frame rod 12 of shopping cart 14 in FIG. 1. In FIG. 1, the rotatable note holder 10 is rotated to a stationary position in which the body of the rotatable note holder is approximately parallel to that of the plane of the shopping cart itself. Thus, plate 16 creates a stationary surface in which coupons 18 may be attached.

Although in the preferred embodiment the rotatable note holder is disclosed attached to rod 12 of the baby basket 20 as shown, it is only illustrative in nature. Therefore, the rotatable note holder can be attached at any position along a frame rod depending upon whether or not the shopper is left or right handed or whatever position is deemed the more convenient about the shopping cart. Further, rotatable note holder 10 can be attached to any of the number of additional positions 22, 24, or 26, as illustrated in FIG. 1.

In the event that the rotatable note holder 10 is not to be utilized, or the shopping cart 14 is to be stacked, the plate 16 is rotated to a position roughly paralleling the side of shopping cart 14 or baby basket wall 20 to which it is affixed. The rotatable note holder 10 is also effective due to the fact that if the user forgets to rotate the plate 16 parallel to a wall of the baby basket, the plate, due to its narrowness and its ability to be positioned at a variety of angles, slips through openings of the following shopping cart 14. The varying positions of the rotatable note holder 10 are illustrated in FIG. 2.

Two designs are disclosed enabling the user to position the rotatable note holder in either the plane of the shopping cart or parallel to one of the walls.

Figure 2:
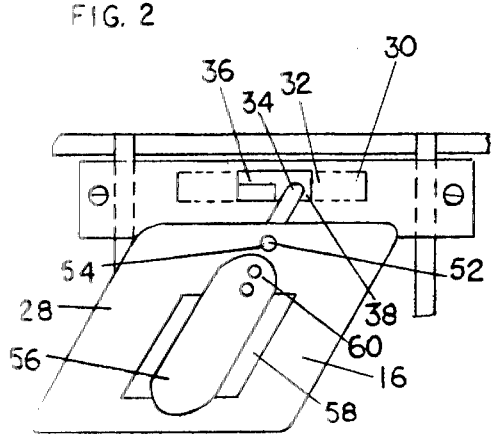
FIG. 2 is a front view of one of the configurations of the rotation mechanism utilized in conjunction with the rotatable note holder.
Figure 3:
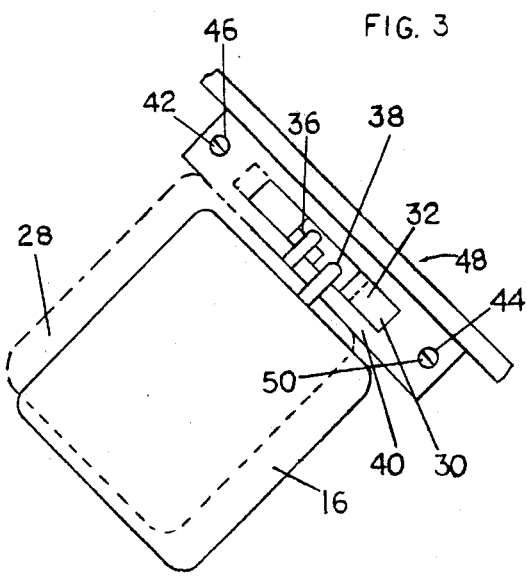
FIG. 3 is a perspective view of the rotatable note holder in a position easily viewed by the shopper, and a second view with the note holder rotated against a side of the cart.

The first design is illustrated in FIGS. 2 and 3. In order for stationary position 28 to be realized, bar 30 may be shifted to the left within chamber 32 until the plate support rod 34 rests atop wall ledge 36 so as to support the weight of plate 16. Chamber 32 is constructed so that its diameter will be longer than that of bar 30 so that bar will move freely within said chamber. Likewise, to realize position 28 wherein the rotatable note holder 10 will not be utilized plate support rod 34 may be shifted to groove 38 located on the side of wall ledge 36 within chamber 32. Once this is done, plate 16 will rotate downward and thereby be out of the way so that the space may be utilized for additional items or the shopping cart may be stacked.

The actual attachment of rotatable note holder 10 to shopping cart 14 is further disclosed in FIG. 3. It illustrates that the attachment mechanism is composed of a front plate 40. Front plate 40 provides for bar 30, chamber 32, groove 38 and wall ledge 36 as described above. Thus, these items are all contained within front plate 40 so that there is only one moving piece to this invention, being said bar 30. Also, contained in front plate 40 are holes 42. Thus, holes 42 are used in conjunction with screws 44 and bolts 46 to support rear plate 48. Hence, two vertical back frame bars may be enclosed between front and rear plates 40 and 48. Further, the front and rear plates 40 and 48 fit adjacent to the rod 30.

Also, contained within rear plate 38 are holes 50. Holes 50 are adjacent to one another as those which are defined in front plate 40. Thus, when front and rear plates 40 and 48 respectively are meshed together with rod 30 therebetween, holes 42 and 50 align themselves so that bolts 46 may be easily inserted therein.

The rotatable note holder may be removed and reinstalled on any of the positions described above by shoppers themselves, if desired, or by the store management. As a consequence, there are several positions of optimum use as also described above.

FIGS. 2 and 3 show a front view of the rotatable note holder 10. Shown therein is front plate 40, chamber 32, bar 30, groove 38, and plate support rod 34. Also shown is bolt 52 which actually attaches to plate support rod 34 by way of hole 54. Also disclosed is clip 56 which actually holds the coupons 58 and is attached to the rectangular plate 16 through pins 60. Although a clip is utilized to affix the coupons, a number of conventional attachments would be equally effective.

Although the body of the rotatable note holder 10 is shown to be rectangular in shape, it is to be understood that it is used only as an example. Thus, the body of the device is adaptable to various shapes and sizes depending upon the usages which are required.

The second rotation mechanism design is illustrated in FIGS. 4, 5, 6 and 7.

The basis of the second design is a rotatable swivel 62. A perspective view of the rotatable swivel is illustrated in FIG. 4. The rotatable swivel comprises a partial enveloping cylinder 64. The partial enveloping cylinder 64 surrounds one of the frame rods 12 of the shopping cart 14. The partial enveloping cylinder 64 is sufficiently loose to allow rotation about the frame rod. Extending from the partial enveloping cylinder 64 are two flanges 66 and 68.

In the preferred embodiment, the flange 66 is longer than the flange 68 and the plate 16 is secured to flange 66 by a conventional bolt and nut. It is to be understood that the length of the flanges are not critical to the invention and a number of lengths will adequately secure the plate 16 to the rotatable swivel 62.

As can be seen in FIG. 4, the flanges 66 and 68 which extend from the partial enveloping cylinder 64 are wider than the width of the partial enveloping cylinder 64. Thus, two ledges 70 and 72 are formed at the base of the partial enveloping cylinder. In the preferred embodiment, the partial enveloping cylinder and the two flanges are made of one piece.

FIG. 5 illustrates the progress of the rotatable swivel. Initially, the rotatable swivel hangs free about frame rod 12. When the user wishes to bring the rotatable note holder into a position to be easily viewed, the user pulls the rotatable note holder plate 16 towards the vertical back frame bar 74. Also, the rotatable swivel is rotated until the ledge 70 is positioned slightly above the back frame bar 74. When the leading edge of the partial enveloping cylinder 76 comes into contact with the back frame bar 74, the rotatable swivel 62 is rotated downward until the lower ledge 70 comes into contact with the back frame bar 74. Thus, the back frame bar constitutes a support for the rotatable swivel 62 as the ledge 70 rests upon it.

To disengage the rotatable swivel 62 the user merely pulls the partial enveloping cylinder away from the back frame bar 74 by sliding the partial enveloping cylinder over the frame rod 12. When the rotatable swivel 62 and the ledge 70 are free from the back frame bar 74, the user merely allows the rotatable swivel to hang free and, thus, the rotatable swivel rotates to a position approximately parallel to the wall of the baby basket upon which it is attached.

FIGS. 6 and 7 illustrate the adaptability of the rotatable swivel 62 to the positioning of the back frame bars 74 in relation to the frame rods 12. Thus, in FIG. 6 the frame bar is attached to the rear of the frame rod 12 and the ledges 70 and 72 are positioned at a given relation.

In FIG. 7 the back frame bar 74 is positioned in the front of the frame rod 12 and the relative positioning of ledges 70 and 72 are made wider about the circumference of the partial enveloping cylinder 64 and the rotatable swivel 62 remains equally effective.

Although a particular preferred embodiment of the invention has been disclosed above for illustrative purposes, it is to be understood that variations or modifications thereof which lie within the scope of the appended claims are contemplated.

I claim:

1. A rotatable note holder for shopping carts for items such as coupons comprising:
   a surface capable of supporting paper;
   a means for attaching pieces of paper to the surface;
   a cylindrical chamber including a lengthwise cutout;
   a ledge built up on one side of the cutout;
   a bar slidably positioned within the chamber;
   a rod affixed at approximately right angles to the bar, the rod passing through the cutout to attach to the bar;
   a means for attaching the rod to the supporting surface; and
   a means for attaching the chamber to the shopping cart.

2. The rotatable note holder of claim 1 wherein the width of the lengthwise cutout of the chamber comprises between 100° and 180° of the cylinder and the wall ledge rises between 30 to 70 percent of the width of the lengthwise cutout.

* * * * *